(12) United States Patent
Croak et al.

(10) Patent No.: US 8,867,525 B1
(45) Date of Patent: Oct. 21, 2014

(54) METHOD AND APPARATUS FOR PROVIDING A VOICE SESSION WITH A COMMERCIAL ADVERTISER DURING A VIDEO SESSION

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1555 days.

(21) Appl. No.: 11/240,669

(22) Filed: Sep. 30, 2005

(51) Int. Cl.
*H04L 12/66* (2006.01)

(52) U.S. Cl.
USPC ........... 370/352; 370/356; 370/351; 370/355; 370/354; 725/60; 725/35

(58) Field of Classification Search
CPC ............. H04M 7/006; H04L 29/06176; H04L 29/06197
USPC ........................ 370/351, 352–356; 725/60, 35
See application file for complete search history.

(56) References Cited

U.S. PATENT DOCUMENTS

| | | | |
|---|---|---|---|
| 6,169,542 B1 * | 1/2001 | Hooks et al. | 715/719 |
| 6,308,327 B1 * | 10/2001 | Liu et al. | 725/37 |
| 6,505,169 B1 * | 1/2003 | Bhagavath et al. | 705/14 |
| 6,593,973 B1 * | 7/2003 | Sullivan et al. | 348/584 |
| 6,802,077 B1 * | 10/2004 | Schlarb | 725/104 |
| 7,159,232 B1 * | 1/2007 | Blackketter et al. | 725/38 |
| 2002/0059117 A1 * | 5/2002 | Yoch et al. | 705/27 |
| 2003/0014754 A1 * | 1/2003 | Chang | 725/60 |
| 2005/0289588 A1 * | 12/2005 | Kinnear | 725/35 |
| 2006/0053456 A1 * | 3/2006 | Kelly | 725/87 |
| 2006/0271963 A1 * | 11/2006 | Mangu et al. | 725/60 |
| 2007/0078989 A1 * | 4/2007 | van Datta et al. | 709/227 |
| 2007/0168418 A1 * | 7/2007 | Ratnakar | 709/204 |
| 2007/0206086 A1 * | 9/2007 | Baron et al. | 348/14.01 |
| 2008/0040741 A1 * | 2/2008 | Matsumoto | 725/32 |
| 2009/0064219 A1 * | 3/2009 | Minor | 725/32 |

* cited by examiner

*Primary Examiner* — Khaled Kassim

(57) ABSTRACT

A method and apparatus for enabling service providers to offer businesses to advertise using commercials over streaming video contents to interact with interested consumers on a real time basis are disclosed. For example, the present method enables an advertiser to display phone numbers, e.g., toll free numbers, that the user can activate to participate in real time voice communication with the advertiser. This voice session can take place in an independent voice only session indicated in a separate display frame from the video session display frame on a television monitor.

7 Claims, 5 Drawing Sheets

METHOD AND APPARATUS FOR PROVIDING A VOICE SESSION WITH A COMMERCIAL ADVERTISER DURING A VIDEO SESSION

The present invention relates generally to communication networks and, more particularly, to a method and apparatus for providing a voice session with a commercial advertiser during a video session in communication networks, e.g., packet networks such as Service over Internet Protocol (SoIP) networks.

BACKGROUND OF THE INVENTION

As extremely high bandwidth access networks become more accessible to residential subscribers, they enable service providers of these networks to integrate voice, video, and data providing more convenience for end customers and creating new service opportunities. Due to the multi-service nature of these new services, networks need to support multiple simultaneous application sessions to a single subscriber. Very often, streaming video contents sent to a subscriber contains commercials of interest to the subscriber. There should be an integrated way for the subscriber to contact the advertiser via real-time voice communications.

Therefore, a need exists for a method and apparatus for providing a voice session with a commercial advertiser during a video session in a packet network, e.g., a SoIP network.

SUMMARY OF THE INVENTION

In one embodiment, the present invention enables service providers to offer businesses to advertise using commercials over streaming video contents to interact with interested consumers on a real time basis. Specifically, a user who requests a video session from the network may be exposed to commercial contents while viewing streaming video contents via a television monitor. This invention enables an advertiser to display phone numbers, such as toll free numbers, that the user can activate to participate in real time voice communication with the advertiser. This voice session can take place in an independent voice only session indicated in a separate display frame from the video session display frame on the television monitor. Alternatively, the voice session can be integrated with a new video session enabling the advertiser to send additional visual contents to the user depending on the user's interest in receiving it. The original streaming video can be placed on hold while the advertiser is engaged in the voice communication with the user or it can be placed in the background in a separate display frame on the television monitor.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
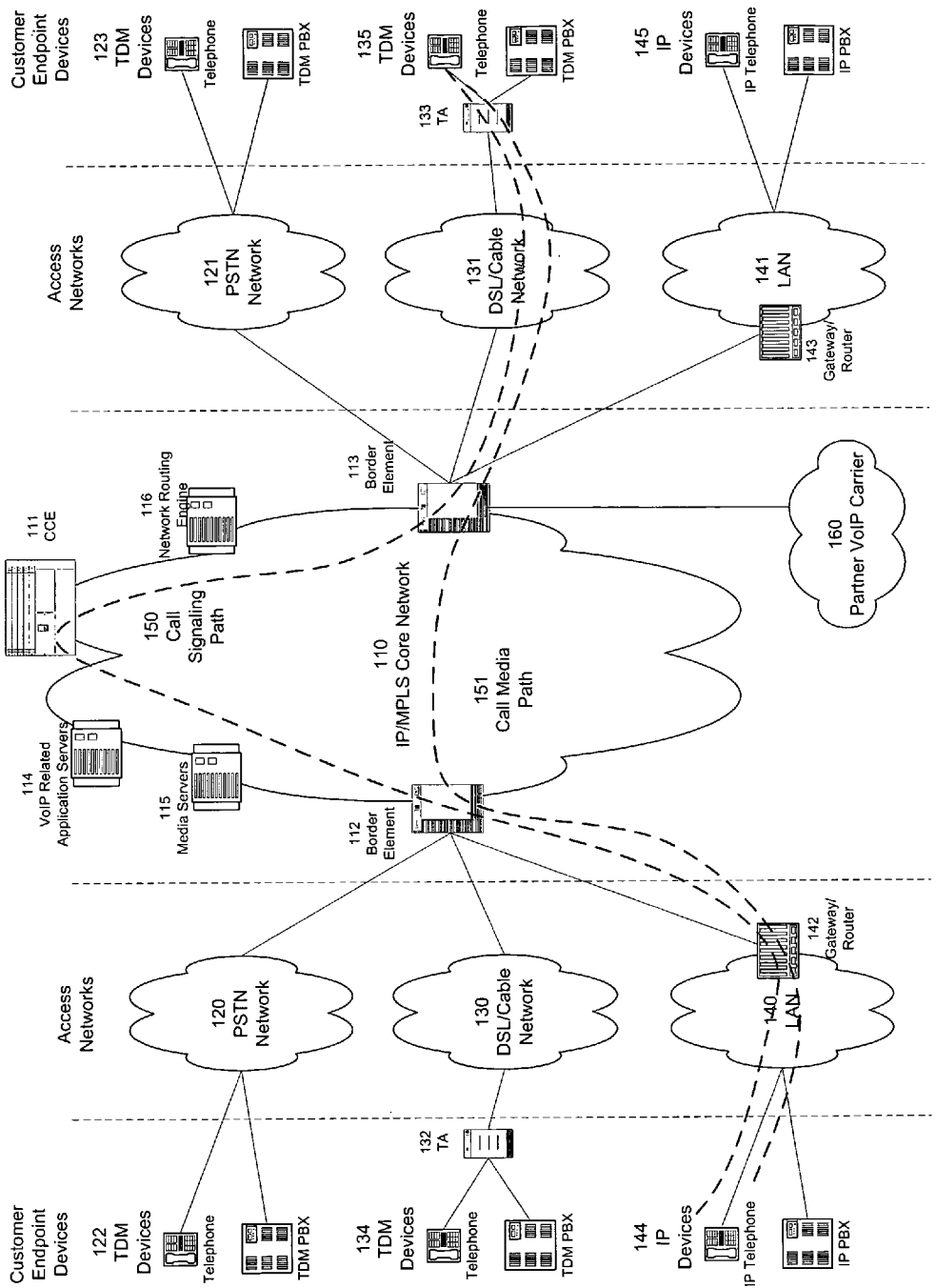
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
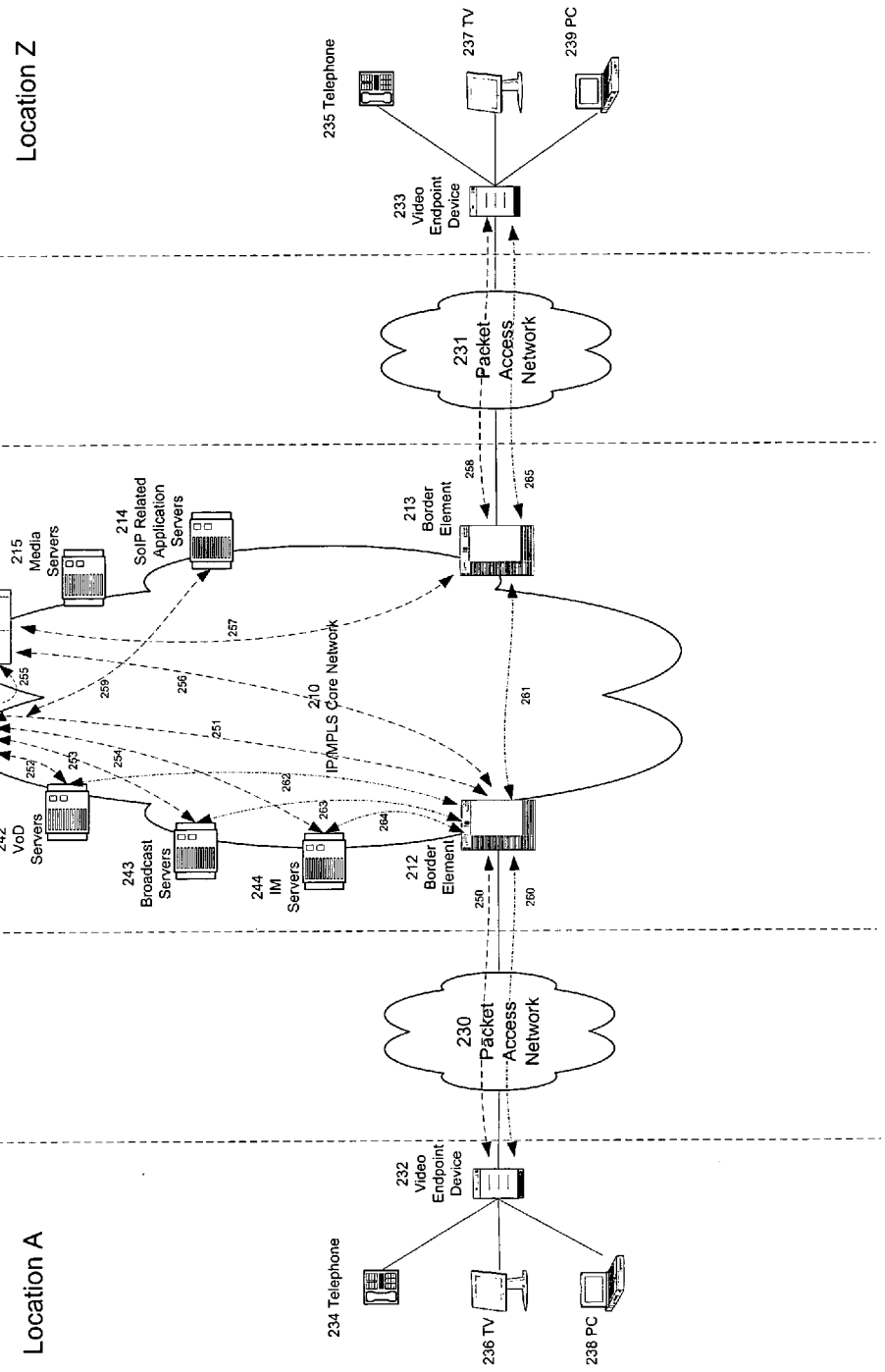
FIG. 2 illustrates an exemplary Service over Internet Protocol (SoIP) network related to the present invention.

The network shown in FIG. 1 can be extended to become a SoIP network that supports multi-service applications including, but not limited to, video services. FIG. 2 illustrates a communication architecture 200 having an example network, e.g., a packet network such as a SoIP network related to the present invention. A SoIP network supports multi-service applications including voice, data, and video services. In one embodiment, a SoIP network that supports video services is described below. In this SoIP network, voice services supported include, but are not limited to, VoIP services; data services supported include, but are not limited to, Instant Messaging (IM), electronic mail (email), internet access services, or any other IP based applications; and video services include, but are not limited to, Video on Demand (VoD), broadcast video, and video conferencing services.

A SoIP network that supports video services comprises an intelligent multi-service endpoint device connected via packet access networks to a service provider's SoIP core infrastructure employing Internet Protocol (IP) and/or Multi-Protocol Label Switching (MPLS) Protocols. Broadly defined, a SoIP network is a network that is capable of carrying voice, video, and data signals as packetized data over an IP network. The present invention is described below in the context of an illustrative SoIP network that supports video services. Thus, the present invention should not be interpreted to be limited by this particular illustrative architecture.

Video endpoint device 232 and 233 are IP based intelligent multi-service endpoint device supporting voice, video, and data applications. Video endpoint device 232 and 233 are signaling endpoints of application sessions, e.g. a VoIP session endpoint, an instant messaging endpoint, or a video session endpoint. In one embodiment, a video endpoint device is a standalone device that can be connected to home electronic appliances such as, but is not limited to, telephone 234 and 235, TV 236 and 237, or Personal Computer (PC) 238 and 239. In another embodiment, a video endpoint device can be integrated with a TV, a PC, or any home appliances with a display.

The access networks are packet based. Packet based access networks 230 and 231 use, but are not limited to, Frame Relay, ATM, Ethernet, IP, DSL or Cable broadband access network technologies to interconnect a video endpoint device to a SoIP network that supports video services.

The core SoIP infrastructure that supports video services comprises of several key components, such the Border Element (BE) 212 and 213, the Call Control Element (CCE) 211, SoIP related Application Servers (AS) 214, Media Servers (MS) 215, Session Controller (SC) 241, Video of Demand (VoD) Servers 242, Broadcast Servers (242), and Instant Messaging (IM) Servers 243. A BE resides at the edge of the SoIP core infrastructure and interfaces with customers endpoints over various types of access networks. The functions supported by a BE include those supported by a BE as previously described in network 100 and FIG. 1. In addition, in a SoIP network that supports video services, a BE also serves as a gateway between a video endpoint device used by a subscriber and the SoIP core network that supports video services. All application sessions initiated by a SoIP subscriber must gain entry to the SoIP core network via a BE. The functions supported by a CCE and a MS are the same as those previously described in network 100 and FIG. 1. A Session Controller (SC) resides within the SoIP infrastructure and is connected to the BEs using an IP based signaling protocol such as, but is not limited to, Session Initiation Protocol (SIP). A SC is responsible for setting up all application session requests, such as VoIP call requests, video session requests, or data session requests, originated by a customer within the network and interacts with, if necessary, the appropriate SoIP related AS in order to complete an application session that requires certain service specific features originated by a customer. A SC also keeps track of all sessions initiated by a customer for session management and billing purposes as well. The functions supported by a SoIP related AS include those supported by a VoIP AS as previously described in network 100 and FIG. 1. In addition, a SoIP AS also supports all video specific application features. A VoD Server is responsible for supporting video on demand video session requests originated by a customer and sends the requested streaming video contents, such as a movie, to the customer. A Broadcast Server is responsible for supporting broadcast video session requested originated by a customer and sends streaming broadcast video contents, such as TV channels, to the customer. The VoD Server and the Broadcast Server sends streaming video contents to video endpoint devices using compression technologies including, but are not limited to, Moving Picture Experts Group (MPEG) 2, MPEG 4, MPEG 7, MPEG 21. An IM Server is responsible for supporting IM applications involving multiple users. Instant Messaging is a form of electronic communication that involves immediate typed text correspondence between two or more users over the Internet who are online simultaneously. IM is a text-based computer conference over the Internet between two or more people who are online at the same time.

In order to illustrate how the different components in a SoIP network operate to support video services, the following scenarios are used to illustrate how voice, data, and video sessions are setup between the SoIP network and a video endpoint. In one embodiment, a customer using video endpoint device 232 at location A places a VoD session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoD session; therefore, the request will be forwarded to VoD Server 242 using signaling path segment 252. SC 241 may interact with AS 214 using signaling path segment 259 to verify customer's subscription information or to retrieve video specific applications or data in order to complete the session request. Once the VoD session is verified, VoD Server 242 sends the requested VoD streaming contents to BE 212 using data path segment 262. BE 212 then forwards the requested VoD streaming contents to video endpoint 232 using data path segment 260. Similarly, a customer at location Z using TV 237 connected to video endpoint 233 can request a VoD session via SC 241 with streaming VoD contents sent by VoD Server 242. Note that a VoD server may be placed closer to end users in a packet access network to serve video endpoints in an alternative embodiment.

In another embodiment, a customer using video endpoint device 232 at location A places a broadcast video session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a broadcast video session for a particular premium TV channel; therefore, the request will be forwarded to Broadcast Server 243 using signaling path segment 253. SC 241 may interact with AS 214 using signaling path segment 259 to verify customer's subscription information or to retrieve video specific applications or data in order to complete the session request. Once the broadcast session is verified, Broadcast Server 243 sends the requested broadcast video streaming contents to BE 212 using data path segment 263. BE 212 then forwards the requested broadcast video streaming contents to video endpoint 232 using data path segment 260. Similarly, a customer at location Z using TV 237 connected to video endpoint 233 can request a broadcast video session via SC 241 with streaming broadcast video contents sent by Broadcast Server 243. Note that a Broadcast server may be placed closer to end users in a packet access network to serve video endpoints in an alternative embodiment.

In another embodiment, a customer using video endpoint device 232 at location A places an IM session request to the video network using PC 238. During the session initiation, a setup signaling message is sent from video endpoint device 232 to BE 212 using signaling path segment 250. BE 212 will then send a setup signaling message, including login and password information of the user, to SC 241 using signaling path segment 251. SC 241 processes the session requests and forwards the request to the appropriate server for further processing. In this case, the request to sign on an IM session; therefore, the request will be forwarded to IM Server 244 using signaling path segment 254. SC 241 may interact with AS 214 using signaling path segment 259 to verify customer's subscription information or to retrieve IM specific applications or data in order to complete the session request. Once the IM session is verified, IM Server 244 establishes the requested IM data path to video endpoint 232 via BE 212 using data path comprising data path segment 260 and 264. Similarly, a customer at location A using TV 236 connected to video endpoint 232 or a customer at location Z using PC 239 or TV 237 connected to video endpoint 233 can request an IM session via SC 241 with IM functions provided by IM Server 244.

In another embodiment, a customer using video endpoint device 232 at location A places a VoIP session request destined to video endpoint device 233 via the SoIP network that supports video services using telephone 234. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoIP session for a call destined to a called party at location Z; therefore, the request will be forwarded to CCE 211 using signaling path segment 255. CCE may interact with AS 214 using signaling path segment 259 to verify customer's subscription information or to retrieve VoIP specific applications or data in order to complete the session request. The signaling flows to establish a VoIP call between video endpoint device 232 and 233 is similar to those described previously in network 100 and FIG. 1. In one embodiment, the Application Server (AS) functions as a SIP back-to-back user agent. Since BE 213 needs to be involved in completing the call; CCE 211 sends another call setup message, such as a SIP-INVITE message if SIP is used, to BE 213 using signaling path segment 257. Upon receiving the call setup message, BE 213 forwards the call setup message, via packet access network 231 to video endpoint device 233 using signaling path segment 258. Video endpoint device 233 then identifies telephone 235 and rings that telephone. Once the call is accepted at location Z by the called party, a call acknowledgement signaling message, such as a SIP 200 OK response message if SIP is used, is sent in the reverse direction back to the CCE 211. After the CCE 211 receives the call acknowledgement message, it will then send a call acknowledgement signaling message, such as a SIP 200 OK response message if SIP is used, toward the calling party at location A using signaling path comprising signaling path segment 256 and 250 via BE 212. In addition, the CCE 211 also provides the necessary information of the call to both BE 212 and BE 213 so that the call data exchange can proceed directly between BE 212 and BE 213. CCE 211 also provides the call completion status of a VoIP call to SC 241. The call media path comprising media path segment 260, 261, and 265 are illustratively shown in FIG. 2. Note that the call signaling path and the call media path are different because once a call has been setup up between two video endpoint devices, SC 241 and CCE 211 does not need to be in the data path for actual direct data exchange.

As extremely high bandwidth access networks become more accessible to residential subscribers, they enable service providers of these networks to integrate voice, video, and data providing more convenience for end customers and creating new service opportunities. Due to the multi-service nature of these new services, networks need to support multiple simultaneous application sessions to a single subscriber. Very often, streaming video contents sent to a subscriber contains commercials of interest to the subscriber. There should be an integrated way for the subscriber to contact the advertiser via real-time voice communications.

To address this need, the present invention enables service providers to offer businesses to advertise using commercials over streaming video contents to interact with interested consumers on a real time basis. Specifically, a user who requests a video session from the network may be exposed to commercial contents while viewing streaming video contents via a television monitor. This invention enables an advertiser to display phone numbers, such as toll free numbers, that the user can activate to participate in real time voice communication with the advertiser. This voice session can take place in an independent voice only session indicated in a separate display frame from the video session display frame on the television monitor. Alternatively, the voice session can be integrated with a new video session enabling the advertiser to send additional visual contents to the user depending on the user's interest in receiving it. The original streaming video can be placed on hold while the advertiser is engaged in the voice communication with the user or it can be placed in the background in a separate display frame on the television monitor.

Figure 3:
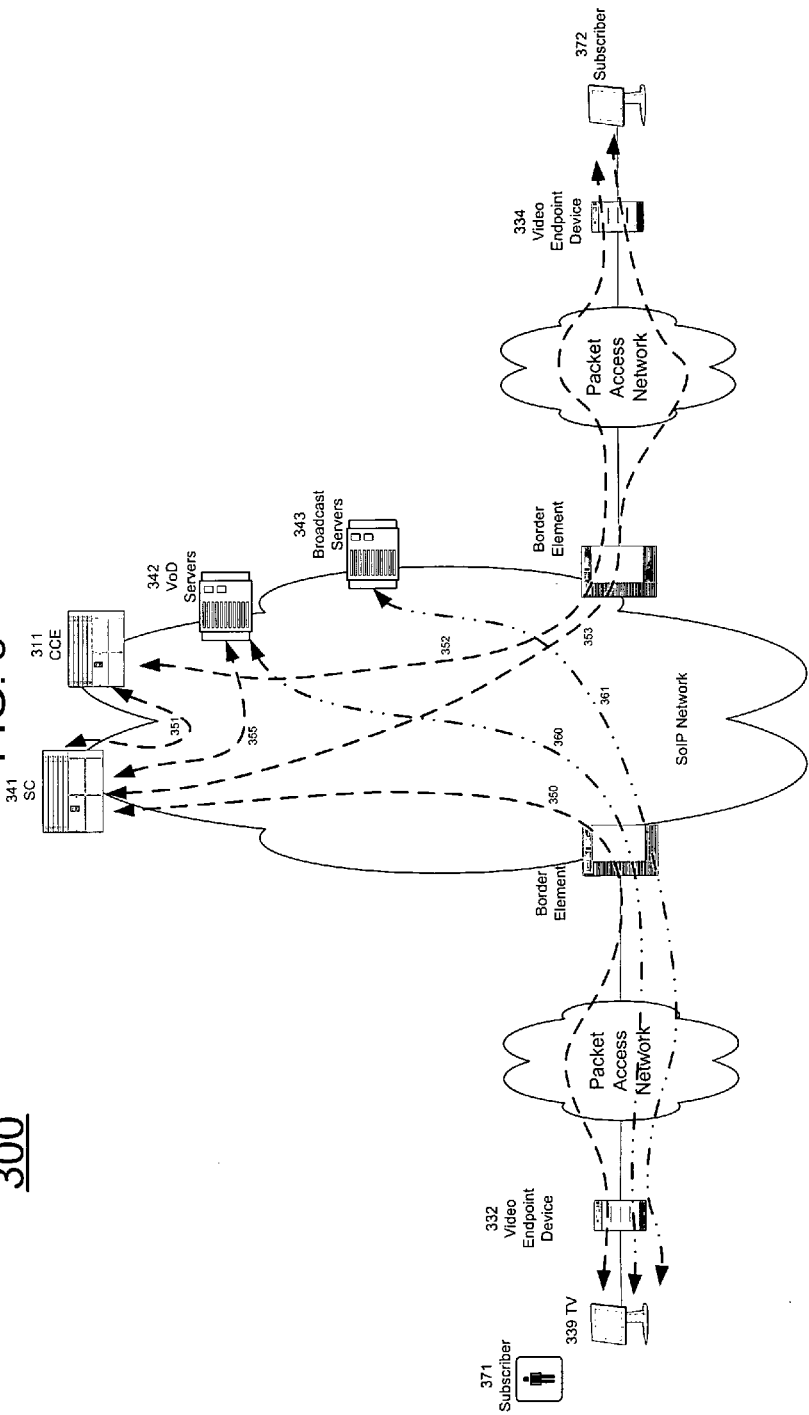
FIG. 3 illustrates an example of providing a voice session with a commercial advertiser during a video session in a packet network, e.g., a SoIP network, of the present invention.

FIG. 3 illustrates an exemplary communication architecture 300 for providing a voice session with a commercial advertiser during a video session in a packet network, e.g., a SoIP network, of the present invention. In FIG. 3, subscriber 371 is watching a streaming broadcast video session containing commercials being sent from broadcast server 343 using video flow 361 to be displayed on TV 339. While subscriber 371 is watching the broadcast, subscriber 371 comes across with a commercial of interest. The commercial contains a phone number of the advertiser, such as a toll free number, that can be activated on screen using a pointer device. Subscriber 371 activates the phone number on screen and a call is automatically made to advertiser 372. Video endpoint 332 sends a call setup message to SC 341 using signaling flow 350. SC 341 forwards the call to CCE 311 using signaling flow 351 to process the call setup message. CCE 311 then completes the call to video endpoint 334 to subscriber 372 using signaling flow 352. Once the call is setup, subscriber 371 and advertiser 372 can conduct voice communications regarding information of interest to subscriber 371. Advertiser 372 can also provide additional visual or video contents to subscriber 371 when necessary and with the permission of subscriber 371. If subscriber 371 is interested in receiving additional visual or video contents of interest, subscriber 371 will accept an offer to receive such contents via a new video session. In particular, advertiser 372 uses video endpoint 334 to send a video session signaling setup message to SC 341 using signaling flow 353 to request a new session to be established to subscriber 371. SC 341 forwards the setup message to VoD server 342, using signaling flow 355, which hosts the additional contents of interests to subscriber 371. Then VoD server 342 sends the video contents requested by advertiser 372 to video endpoint 332 to be viewed by subscriber 371 using video flow 360.

Note that during the voice communications between subscriber 371 and advertiser 372, subscriber 371 can manipulate the existing broadcast video session by placing the video session on hold or continuing the video session as is in a display frame in the background on display 339.

Figure 4:
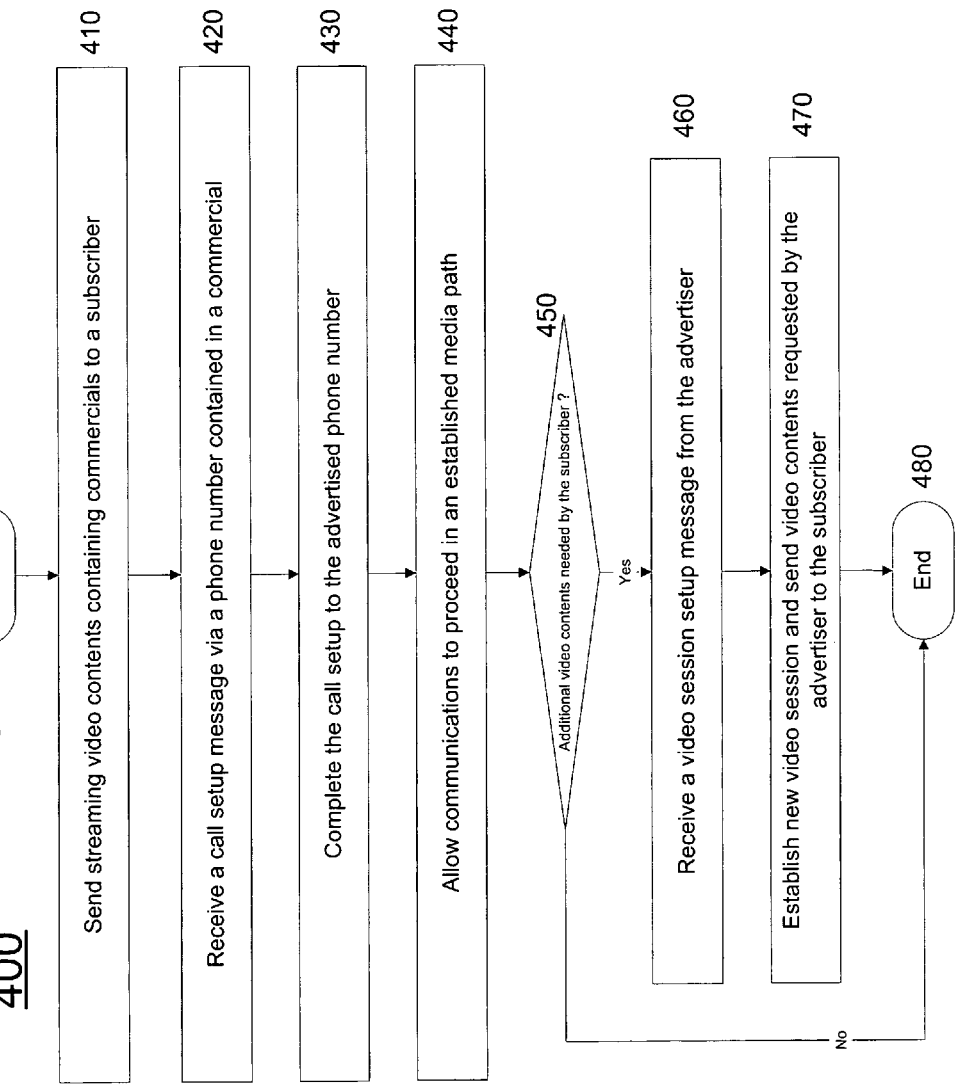
FIG. 4 illustrates a flowchart of a method for providing a voice session with a commercial advertiser during a video session in a packet network, e.g., a SoIP network, of the present invention.

FIG. 4 illustrates a flowchart of a method 400 for providing a voice session with a commercial advertiser during a video session in a packet network, e.g., a SoIP network, of the present invention. Method 400 starts in step 405 and proceeds to step 410.

In step 410, the method is sending streaming video content containing commercials to a subscriber. The streaming video content is sent by a VoD Server or a Broadcast Server.

In step 420, the method receives a call setup message from the subscriber which has been activated by the subscriber by selecting an advertised phone number shown in a commercial in the streaming video contents on the video display device to the subscriber. The call setup message is received by a SC.

In step 430, the method completes the call setup to the advertised phone number. The SC forwards the call setup message to a CCE to complete the call setup procedures.

In step 440, the method allows voice communications to proceed in an established media path between the advertiser and the subscriber. The media path for voice communications is set up by the CCE. Note that during the voice communications between the subscriber and the advertiser, the subscriber can manipulate the existing video session by placing the video session on hold or continuing the video session as is in a display frame in the background.

In step 450, the method checks if additional video contents are needed by the subscriber. For instance, the advertiser can suggest providing additional video contents to the subscriber and if the subscriber accepts such an offer, the advertiser can proceed to request additional video contents to be sent. If additional video contents are needed by the subscriber, the method proceeds to step 460; otherwise, the method proceeds to step 480.

In step 460, the method receives a video session setup signaling message originated by the advertiser to request additional video contents to be sent to the subscriber. The video session setup signaling message is received by the SC.

In step 470, the method establishes a new video session and sends the additional video contents requested by the advertiser to the subscriber. The SC forwards the video session setup signaling message to the VoD Server to setup a new video session between the VoD Server and the subscriber. Upon the subscriber's request, the subscriber can also join the voice session and the new video session into a single application session. The method ends in step 480.

Figure 5:
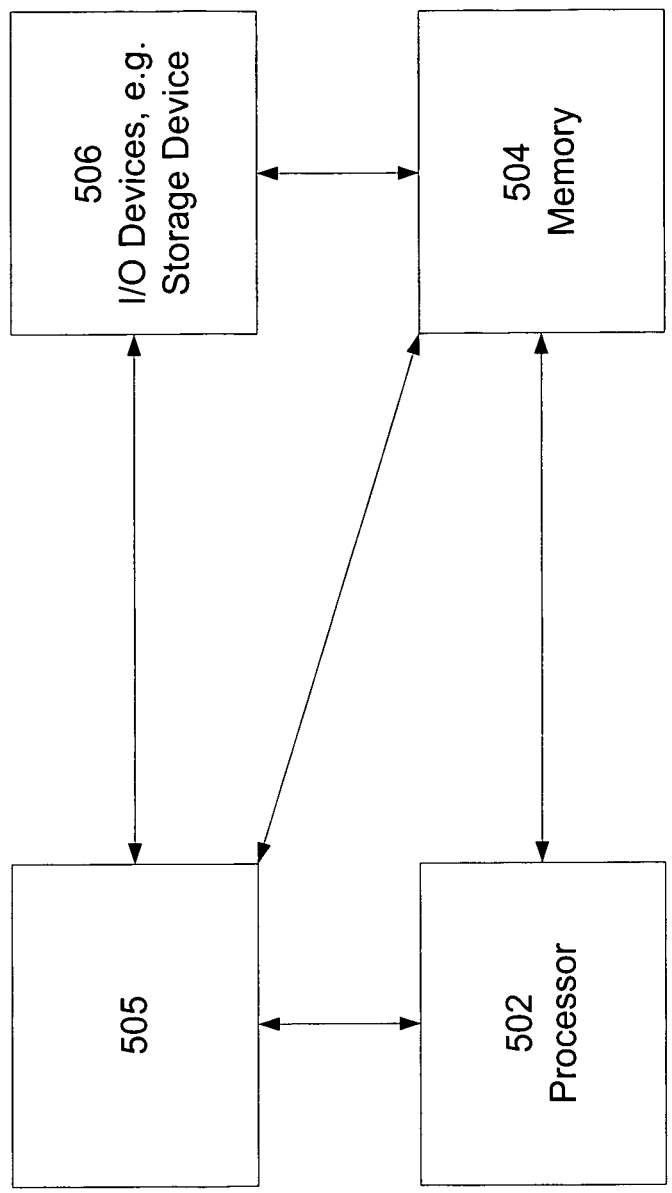
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a voice session with a commercial advertiser during a video session, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing a voice session with a commercial advertiser during a video session can be loaded into memory 504 and executed by processor 502 to implement the functions as discussed above. As such, the present process 505 for providing a voice session with a commercial advertiser during a video session (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a voice session with an advertiser during an established video session in a communication network, comprising:
   activating, by a session controller deployed within the communication network, the voice session to a phone number in response to an input provided by a subscriber, wherein the input comprises the subscriber clicking the phone number that is displayed using a pointer device, wherein the phone number is a phone number of the advertiser that is displayed in the established video session, wherein the phone number is displayed along with the established video session in an independent display frame on a video display device, wherein the established video session comprises a first video content sent from a broadcast server in the communication network, wherein the activating comprises setting up the voice session to the phone number once the input is received from the subscriber, wherein the voice session is setup by the session controller via a call control element within the communication network;
   presenting, by the session controller, to the subscriber from the advertiser via the voice session an offer to view additional video content using a second video session; and
   establishing, by the session controller, the second video session offered by the advertiser to the subscriber when the subscriber accepts the offer, wherein the session controller establishes the second video session in response to a video session setup signaling message from the advertiser by forwarding the video session setup signaling message, originated by the advertiser, to a video on demand server, to set up the second video session between the subscriber and the video on demand server, wherein the additional video content is stored within the communication network at the video on demand server, wherein the session controller establishes the second video session by requesting the video on demand server to send the additional video content via the second video session to the subscriber, and wherein the subscriber is enabled to select between placing the established video session on hold and continuing the established video session in a background in the independent display frame while engaging in the voice session and the second video session.

2. The method of claim 1, wherein the communication network is a service over internet protocol network.

3. The method of claim 1, wherein the activating further comprises:
   enabling voice communications between the subscriber and a representative of the advertiser once the voice session is setup.

4. A non-transitory computer-readable storage medium storing a plurality of instructions which, when executed by a processor of a session controller deployed in a communication network, cause the processor to perform operations for providing a voice session with an advertiser during an established video session in the communication network, the operations comprising:
   activating the voice session to a phone number in response to an input provided by a subscriber, wherein the input comprises the subscriber clicking the phone number that is displayed using a pointer device, wherein the phone number is a phone number of the advertiser that is displayed in the established video session, wherein the phone number is displayed along with the established video session in an independent display frame on a video display device, wherein the established video session comprises a first video content sent from a broadcast server in the communication network, wherein the activating comprises setting up the voice session to the phone number once the input is received from the subscriber, wherein the voice session is setup by the session controller via a call control element within the communication network;
   presenting to the subscriber from the advertiser via the voice session an offer to view additional video content using a second video session; and
   establishing the second video session offered by the advertiser to the subscriber when the subscriber accepts the offer, wherein the session controller establishes the second video session in response to a video session setup signaling message from the advertiser by forwarding the video session setup signaling message, originated by the advertiser, to a video on demand server, to set up the second video session between the subscriber and the video on demand server, wherein the additional video content is stored within the communication network at the video on demand server, wherein the session controller establishes the second video session by requesting the video on demand server to send the additional video content via the second video session to the subscriber, and wherein the subscriber is enabled to select between placing the established video session on hold and continuing the established video session in a background in the independent display frame while engaging in the voice session and the second video session.

5. The non-transitory computer-readable storage medium of claim 4, wherein the communication network is a service over internet protocol network.

6. The non-transitory computer-readable storage medium of claim 4, wherein the activating further comprises:
enabling voice communications between the subscriber and a representative of the advertiser once the voice session is setup.

7. An apparatus for providing a voice session with an advertiser during an established video session in a communication network, comprising:
a hardware processor of a session controller deployed in the communication network; and
a computer-readable medium storing instructions which, when executed by the hardware processor, cause the hardware processor to perform operations, the operations comprising:
activating the voice session to a phone number in response to an input provided by a subscriber, wherein the input comprises the subscriber clicking the phone number that is displayed using a pointer device, wherein the phone number is a phone number of the advertiser that is displayed in the established video session, wherein the phone number is displayed along with the established video session in an independent display frame on a video display device, wherein the established video session comprises a first video content sent from a broadcast server in the communication network, wherein the activating comprises setting up the voice session to the phone number once the input is received from the subscriber, wherein the voice session is setup by the session controller via a call control element within the communication network;
presenting to the subscriber from the advertiser via the voice session an offer to view additional video content using a second video session; and
establishing the second video session offered by the advertiser to the subscriber when the subscriber accepts the offer, wherein the session controller establishes the second video session in response to a video session setup signaling message from the advertiser by forwarding the video session setup signaling message, originated by the advertiser, to a video on demand server, to set up the second video session between the subscriber and the video on demand server, wherein the additional video content is stored within the communication network at the video on demand server, wherein the session controller establishes the second video session by requesting the video on demand server to send the additional video content via the second video session to the subscriber, and wherein the subscriber is enabled to select between placing the established video session on hold and continuing the established video session in a background in the independent display frame while engaging in the voice session and the second video session.

* * * * *